United States Patent
Brown et al.

(10) Patent No.: US 8,074,066 B2
(45) Date of Patent: Dec. 6, 2011

(54) SYSTEM AND METHOD FOR SENDING SECURE MESSAGES

(75) Inventors: Michael S. Brown, Waterloo (CA);
Michael G. Kirkup, Waterloo (CA);
Herb Little, Waterloo (CA)

(73) Assignee: Research In Motion Limited, Waterloo (CA)

( * ) Notice: Subject to any disclaimer, the term of this patent is extended or adjusted under 35 U.S.C. 154(b) by 994 days.

(21) Appl. No.: 11/039,789

(22) Filed: Jan. 24, 2005

(65) Prior Publication Data

US 2005/0262552 A1    Nov. 24, 2005

Related U.S. Application Data

(60) Provisional application No. 60/568,451, filed on May 5, 2004.

(51) Int. Cl.
*H04L 29/06* (2006.01)

(52) U.S. Cl. .......................... 713/156; 713/168

(58) Field of Classification Search ............. 713/156
See application file for complete search history.

(56) References Cited

U.S. PATENT DOCUMENTS

| | | | |
|---|---|---|---|
| 5,606,617 A | 2/1997 | Brands | |
| 6,742,127 B2* | 5/2004 | Fox et al. | 726/10 |
| 6,760,752 B1* | 7/2004 | Liu et al. | 709/206 |
| 6,990,578 B1* | 1/2006 | O'Brien et al. | 713/156 |
| 7,017,041 B2* | 3/2006 | Sandhu et al. | 713/156 |
| 7,290,133 B1* | 10/2007 | Montgomery | 713/156 |
| 7,743,248 B2* | 6/2010 | Bisbee et al. | 713/158 |
| 2001/0034834 A1* | 10/2001 | Matsuyama et al. | 713/156 |
| 2002/0059144 A1* | 5/2002 | Meffert et al. | 705/51 |
| 2003/0037261 A1* | 2/2003 | Meffert et al. | 713/201 |
| 2004/0049675 A1* | 3/2004 | Micali et al. | 713/158 |
| 2004/0133774 A1* | 7/2004 | Callas et al. | 713/153 |
| 2005/0250473 A1 | 11/2005 | Brown et al. | |
| 2007/0050624 A1* | 3/2007 | Lord et al. | 713/168 |

FOREIGN PATENT DOCUMENTS

EP    0 942 568 A2    9/1999

(Continued)

OTHER PUBLICATIONS

Maanyoung Lee et al., "Internet Security Technology", published by Sangneung, pp. 195-204 (Aug. 25, 2002). [English translation of Fig. 3-38 included.].

(Continued)

*Primary Examiner* — Kambiz Zand
*Assistant Examiner* — Dant Shaifer Harriman
(74) *Attorney, Agent, or Firm* — Jenna L. Wilson; Dimock Stratton LLP

(57) ABSTRACT

Electronic messages are sent from a sending system to an identified recipient and are encoded using information contained in a certificate. A key store is accessed by a messaging application to determine if a certificate associated with the recipient is present. If no certificate is present in the key store the messaging application accesses one or more certificate services to obtain a certificate. Where validation of the retrieved certificate is required, the messaging application invokes a certificate validation process. One or more further certificates are obtained by the messaging application where the retrieved certificate is invalid.

30 Claims, 5 Drawing Sheets

| FOREIGN PATENT DOCUMENTS | | |
|---|---|---|
| EP | 1592194 A1 | 11/2005 |
| JP | 2002163395 | 6/2002 |
| JP | 2003107994 | 4/2003 |
| JP | 2003198632 | 7/2003 |
| JP | 2003258786 | 9/2003 |
| JP | 200415252 | 1/2004 |
| WO | 02101605 | 12/2002 |
| WO | 02102009 A2 | 12/2002 |
| WO | 03/023686 A2 | 3/2003 |
| WO | WO 2004/063870 A2 | 7/2004 |

OTHER PUBLICATIONS

Jong-Phil Yang et al., "Practical Modification of an Efficient Public-Key Framework", The IEEE International Conference (EEE'04), pp. 554-557 (Mar. 28, 2004).

Menezes, Oorschot, Vanstone: "Handbook of Applied Cryptography", Handbook of Applied Cryptography, CRC Press Series on Discrete Mathematics and Its Applications, 1997, pp. 555-560, 37-39, 546-550, 572-577, XP002423045.

\* cited by examiner

SYSTEM AND METHOD FOR SENDING SECURE MESSAGES

BACKGROUND

1. Technical Field

The present invention relates generally to the field of communications, and in particular to a system and method for sending secure messages.

2. Description of the Related Art

Messages sent over communications networks are typically encoded in order to provide one or more cryptographic services such as authentication, encryption and non-repudiation. A message sender may digitally sign a message prior to transmission to a message recipient in order to authenticate the sender to the recipient, and to prove to the recipient that the message was not tampered with during transmission. The sender may also encrypt the message in order to prevent unauthorized viewing of the message by a party other than the recipient. In known systems, certificates are issued to users in order to support such cryptographic services. The certificates comprise information that may be used in algorithms that provide cryptographic services. For instance, the certificate may comprise information such as a public key for a user and a validity period for the certificate.

When the sender sends the message to one or more recipients, a messaging application, such as Microsoft Outlook™ or Lotus Notes™, retrieves the certificates for the recipients, and encodes the message to each recipient using information extracted from the certificates. As an example, the messaging application may use public key information extracted from the certificate in order to encrypt the message to the recipient.

Certificates may be stored in a Key Store that applications access in order to retrieve the certificates. If the certificate is not available in the Key Store, the sender may not be able to send the message until the certificate is made available. In order to do this, the sender has to retrieve the required certificates prior to sending the message. If the message has already been composed, the sender has to invoke a secondary application in order to retrieve the certificates, and then return to the messaging application in order to send the message.

The certificates may also become invalid over time. For instance, they may be revoked if certain information, such as the private key associated with the certificate, becomes compromised. They may also simply expire. If the message is encoded with an invalid certificate, recipients may not be able to authenticate the sender or be able to decrypt the message if it was signed or encrypted with a private key that is associated with an invalid public key.

SUMMARY OF THE INVENTION

In accordance with the teachings provided herein, systems and methods are provided for sending secure messages. As an example of a system and method, on initiation of a message sending sequence, one or more certificates for each message recipient are retrieved from a key store, or if unavailable in the key store, from one or more certificate services. If the certificates require validation, one or more certificate status providers are queried in order to retrieve the validity status of each certificate. The message is encoded for each message recipient using information present in an associated certificate, and then sent to the message recipients.

As a further example of a method there is provided a method for sending an electronic message to an identified recipient using a sender system, the sender system including a messaging application and the sender system being operative to access a key store for the storage of security certificates associated with recipients, the method including the steps of:

the messaging application accessing the key store to determine if a security certificate associated with the identified recipient is present, on condition that a certificate associated with the identified recipient is present in the key store, the message application retrieving the security certificate, the messaging application determining whether validation of the retrieved certificate is required and, on condition that the validation is required, the messaging application invoking a certificate validation process, on condition that there is no security certificate associated with the identified recipient present in the accessed key store, the messaging application accessing one or more certificate services for retrieving a security certificate associated with the identified recipient, the messaging application determining whether validation of the retrieved certificate is required and, on condition that the validation is required, the messaging application invoking a certificate validation process, on condition that the retrieved certificate is valid, the messaging application encoding the electronic message using information contained in the retrieved certificate, and the messaging application sending the encoded message to the identified recipient.

As a further example of a method there is provided the above method further including the steps, on condition that the retrieved certificate is invalid, of the messaging application accessing one or more additional certificate services for obtaining a further certificate associated with the identified recipient to replace the retrieved certificate.

As a further example of a method there is provided the above method in which the sender system includes a wireless handheld device and a host system, the messaging application executing on the wireless handheld device, the wireless handheld device being operable to connect to the host system and including one or more memory devices for storing the key store, and the host system providing one or more certificate services.

As a further example of a method there is provided the above method further including the initial steps of:

a user composing the electronic message using the messaging application, the messaging application accepting a request from the user to send the electronic message to the identified recipient; and the messaging application determining that the electronic message is to be sent securely to the identified recipient.

As a further example of a system there is provided a system for sending an electronic message to an identified recipient, the system including:

a key store accessible to determine if a security certificate associated with the identified recipient is present in the key store, messaging application program code operative, on condition that a certificate associated with the identified recipient is present in the key store, to retrieve the security certificate, to determine whether validation of the retrieved certificate is required and, on condition that the validation is required, to invoke a certificate validation process, messaging application program code operative, on condition that there is no security certificate associated with the identified recipient present in the key store, to access one or more certificate services for retrieving a security certificate associated with the identified recipient, to determine whether validation of the retrieved certificate is required and operative, on condition that the validation is required, to invoke a certificate validation process, messaging application program code operative, on condition that the retrieved certificate status is valid, to encode the electronic message using information contained in the retrieved certificate, and messaging application program code operative to send the encoded message to the identified recipient.

As a further example of a system there is provided the above system in which the system further includes messaging application program code operative, on condition that the retrieved certificate is invalid, to access one or more certificate services for obtaining a further certificate associated with the identified recipient to replace the retrieved certificate.

As a further example of a system there is provided the above system, the messaging application program code further including:

code operative for a user to compose the electronic message, code operative to accept a request from the user to send the electronic message to the identified recipient; and code operative to determine that the electronic message is to be sent securely to the identified recipient.

In accordance with the teachings provided herein there is provided a computing device program product for obtaining valid certificates for an electronic message being sent to an identified recipient, the program product including messaging application program code embodied on computing device program product media, the messaging application program code including:

code operative to determine if a security certificate associated with the identified recipient is present in a key store, code operative, on condition that a certificate associated with the identified recipient is present in the key store, to retrieve the security certificate, to determine whether validation of the retrieved certificate is required and, on condition that the validation is required, to invoke a certificate validation process, code operative, on condition that there is no security certificate associated with the identified recipient present in the key store, to access one or more certificate services for retrieving a security certificate associated with the identified recipient, to determine whether validation of the retrieved certificate is required and operative, on condition that the validation is required, to invoke a certificate validation process.

In accordance with the teachings provided herein there is provided a handheld wireless device including a memory for storing a key store and including a messaging application for sending an electronic message from the wireless handheld device to an identified recipient, the messaging application including code operative to determine if a security certificate associated with the identified recipient is present in the key store, code operative, on condition that a certificate associated with the identified recipient is present in the key store, to retrieve the security certificate, to determine whether validation of the retrieved certificate is required and, on condition that the validation is required, to invoke a certificate validation process, code operative, on condition that there is no security certificate associated with the identified recipient present in the key store, to access one or more certificate services for retrieving a security certificate associated with the identified recipient, to determine whether validation of the retrieved certificate is required and operative, on condition that the validation is required, to invoke a certificate validation process, code operative, on condition that the retrieved certificate status is valid, to encode the electronic message using information contained in the retrieved certificate, and code operative to send the encoded message to the identified recipient.

As will be appreciated, the invention is capable of other and different embodiments, and its several details are capable of modifications in various respects, all without departing from the spirit of the invention. Accordingly, the drawings and description of the preferred embodiments set forth below are to be regarded as illustrative in nature and not restrictive.

BRIEF DESCRIPTION OF THE DRAWINGS

In drawings which illustrate an embodiment of the invention by way of example only.

DETAILED DESCRIPTION

Figure 1:
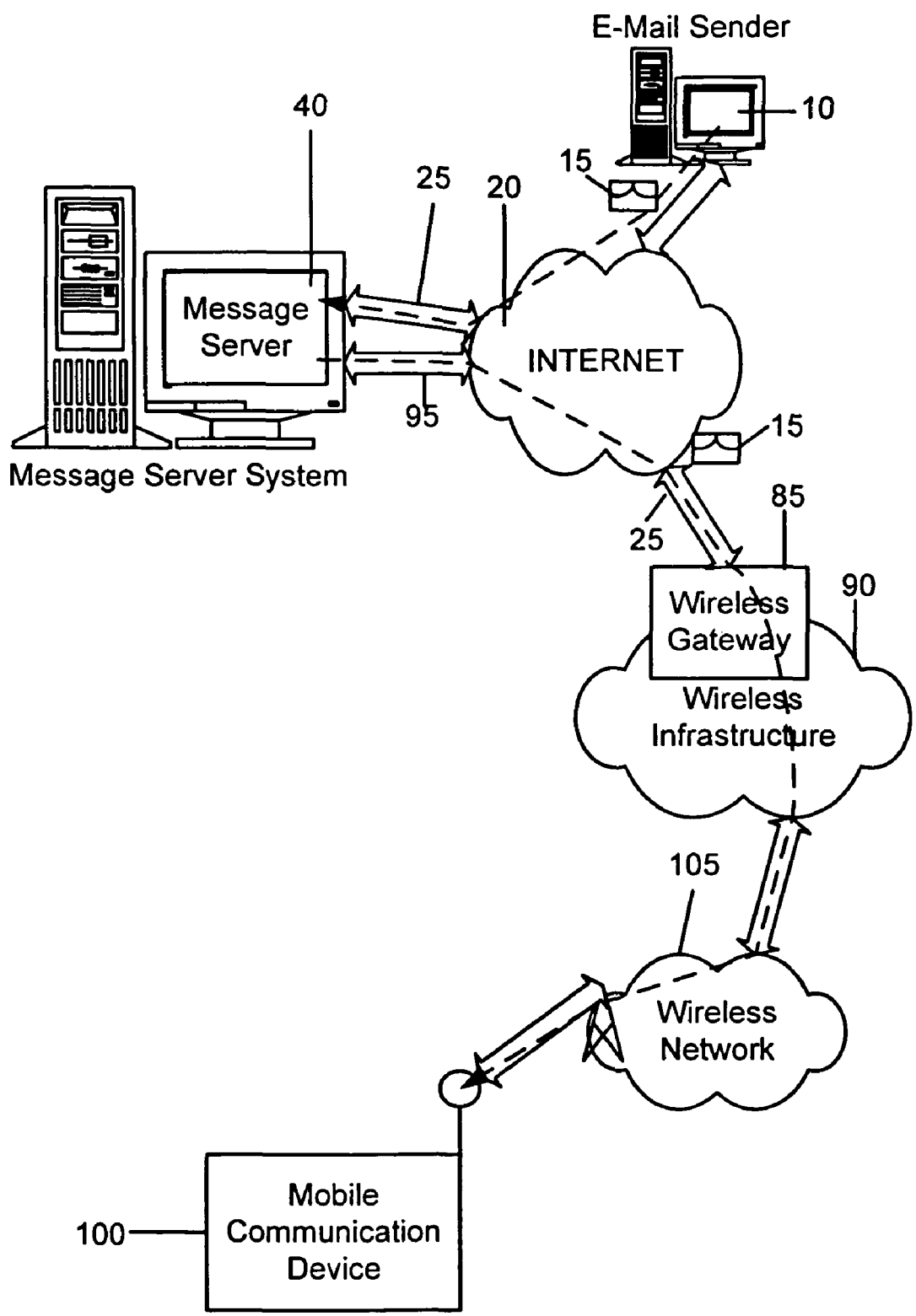
FIG. 1 is block diagram of an example communication system in which a wireless device may be used.

FIG. 1 is an overview of an example communication system in which a wireless communication device may be used. One skilled in the art will appreciate that there may be hundreds of different topologies, but the system shown in FIG. 1 helps demonstrate the operation of the encoded message processing systems and methods described in the present application. There may also be many message senders and recipients. The simple system shown in FIG. 1 is for illustrative purposes only, and shows perhaps the most prevalent Internet e-mail environment where security is not generally used.

FIG. 1 shows an e-mail sender 10, the Internet 20, a message server system 40, a wireless gateway 85, wireless infrastructure 90, a wireless network 105 and a mobile communication device 100.

An e-mail sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as America Online (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail exchange over the Internet 20. Although other messaging systems might not require a message server system 40, a mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the secure message processing described below. Message servers such as server 40 typically extend beyond just e-mail sending and receiving; they also include dynamic database storage engines that have predefined database formats for data like calendars, to-do lists, task lists, e-mail and documentation.

The wireless gateway 85 and infrastructure 90 provide a link between the Internet 20 and wireless network 105. The wireless infrastructure 90 determines the most likely network for locating a given user and tracks the user as they roam between countries or networks. A message is then delivered to the mobile device 100 via wireless transmission, typically at a radio frequency (RF), from a base station in the wireless network 105 to the mobile device 100. The particular network 105 may be virtually any wireless network over which messages may be exchanged with a mobile communication device.

As shown in FIG. 1, a composed e-mail message 15 is sent by the e-mail sender 10, located somewhere on the Internet 20. This message 15 is normally fully in the clear and uses traditional Simple Mail Transfer Protocol (SMTP), RFC822 headers and Multipurpose Internet Mail Extension (MIME) body parts to define the format of the mail message. These techniques are all well known to those skilled in the art. The message 15 arrives at the message server 40 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In a preferred embodiment described in further detail below, messages addressed to a message server account associated with a host system such as a home computer or office computer which belongs to the user of a mobile device 100 are redirected from the message server 40 to the mobile device 100 as they are received.

Regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
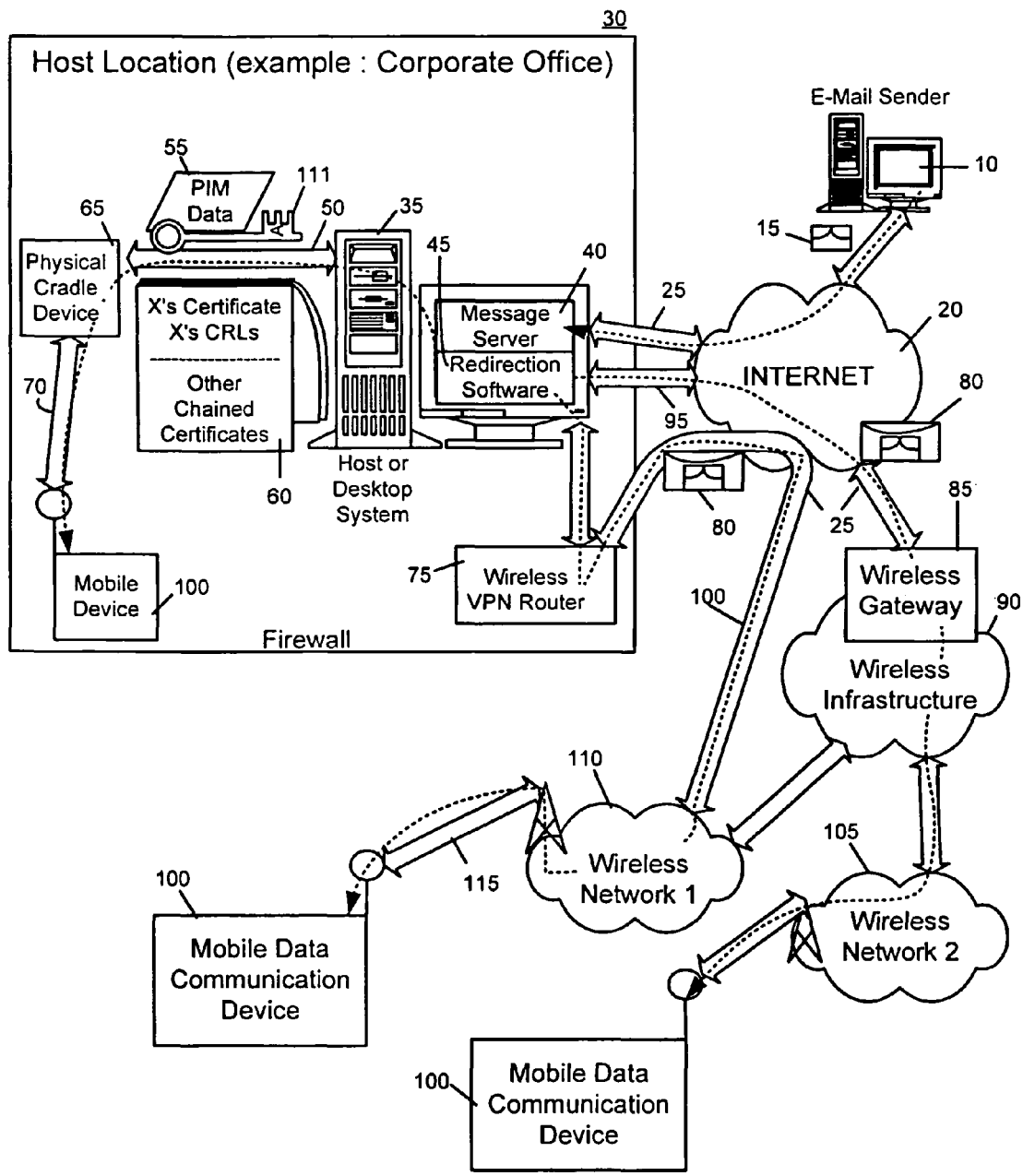
FIG. 2 is a block diagram of a further example communication system.

FIG. 2 is a block diagram of a further example communication system including multiple networks and multiple mobile communication devices. The system of FIG. 2 is substantially similar to the FIG. 1 system, but includes a host system 30, a redirection program 45, a mobile device cradle 65, a wireless virtual private network (VPN) router 75, an additional wireless network 110 and multiple mobile communication devices 100. As described above in conjunction with FIG. 1, FIG. 2 represents an overview of a sample network topology. Although the encoded message processing systems and methods described herein may be applied to networks having many different topologies, the network of FIG. 2 is useful in understanding an automatic e-mail redirection system mentioned briefly above.

The central host system 30 will typically be a corporate office or other LAN, but may instead be a home office computer or some other private system where mail messages are being exchanged. Within the host system 30 is the message server 40, running on some computer within the firewall of the host system, that acts as the main interface for the host system to exchange e-mail with the Internet 20. In the system of FIG. 2, the redirection program 45 enables redirection of data items from the server 40 to a mobile communication device 100. Although the redirection program 45 is shown to reside on the same machine as the message server 40 for ease of presentation, there is no requirement that it must reside on the message server. The redirection program 45 and the message server 40 are designed to co-operate and interact to allow the pushing of information to mobile devices 100. In this installation, the redirection program 45 takes confidential and non-confidential corporate information for a specific user and redirects it out through the corporate firewall to mobile devices 100. A more detailed description of the redirection software 45 may be found in the commonly assigned U.S. Pat. No. 6,219,694 ("the '694 Patent"), entitled "System and Method for Pushing Information From A Host System To A Mobile Data Communication Device Having A Shared Electronic Address", and issued to the assignee of the instant application on Apr. 17, 2001, which is hereby incorporated into the present application by reference. This push technique may use a wireless friendly encoding, compression and encryption technique to deliver all information to a mobile device, thus effectively extending the security firewall to include each mobile device 100 associated with the host system 30.

As shown in FIG. 2, there may be many alternative paths for getting information to the mobile device 100. One method for loading information onto the mobile device 100 is through a port designated 50, using a device cradle 65. This method tends to be useful for bulk information updates often performed at initialization of a mobile device 100 with the host system 30 or a computer 35 within the system 30. The other main method for data exchange is over-the-air using wireless networks to deliver the information. As shown in FIG. 2, this may be accomplished through a wireless VPN router 75 or through a traditional Internet connection 95 to a wireless gateway 85 and a wireless infrastructure 90, as described above. The concept of a wireless VPN router 75 is new in the wireless industry and implies that a VPN connection could be established directly through a specific wireless network 110 to a mobile device 100. The possibility of using a wireless VPN router 75 has only recently been available and could be used when the new Internet Protocol (IP) Version 6 (IPV6) arrives into IP-based wireless networks. This new protocol will provide enough IP addresses to dedicate an IP address to every mobile device 100 and thus make it possible to push information to a mobile device 100 at any time. A principal advantage of using this wireless VPN router 75 is that it could be an off-the-shelf VPN component, thus it would not require a separate wireless gateway 85 and wireless infrastructure 90 to be used. A VPN connection would preferably be a Transmission Control Protocol (TCP)/IP or User Datagram Protocol (UDP)/IP connection to deliver the messages directly to the mobile device 100. If a wireless VPN 75 is not available then a link 95 to the Internet 20 is the most common connection mechanism available and has been described above.

In the automatic redirection system of FIG. 2, a composed e-mail message 15 leaving the e-mail sender 10 arrives at the message server 40 and is redirected by the redirection program 45 to the mobile device 100. As this redirection takes place the message 15 is re-enveloped, as indicated at 80, and a possibly proprietary compression and encryption algorithm can then be applied to the original message 15. In this way, messages being read on the mobile device 100 are no less secure than if they were read on a desktop workstation such as 35 within the firewall. All messages exchanged between the redirection program 45 and the mobile device 100 preferably use this message repackaging technique. Another goal of this outer envelope is to maintain the addressing information of the original message except the sender's and the receiver's address. This allows reply messages to reach the appropriate destination, and also allows the "from" field to reflect the mobile user's desktop address. Using the user's e-mail address from the mobile device 100 allows the received message to appear as though the message originated from the user's desktop system 35 rather than the mobile device 100.

With reference back to the port 50 and cradle 65 connectivity to the mobile device 100, this connection path offers many advantages for enabling one-time data exchange of large items. For those skilled in the art of personal digital assistants (PDAs) and synchronization, the most common data exchanged over this link is Personal Information Management (PIM) data 55. When exchanged for the first time this data tends to be large in quantity, bulky in nature and requires a large bandwidth to get loaded onto the mobile device 100 where it can be used on the road. This serial link may also be used for other purposes, including setting up a private security key 111 such as an S/MIME or PGP specific private key, the Certificate (Cert) of the user and their Certificate Revocation Lists (CRLs) 60. The private key is preferably exchanged so that the desktop 35 and mobile device 100 share one personality and one method for accessing all mail. The Cert and CRLs are normally exchanged over such a link because they represent a large amount of the data that is required by the device for S/MIME, PGP and other public key security methods.

Figure 3:
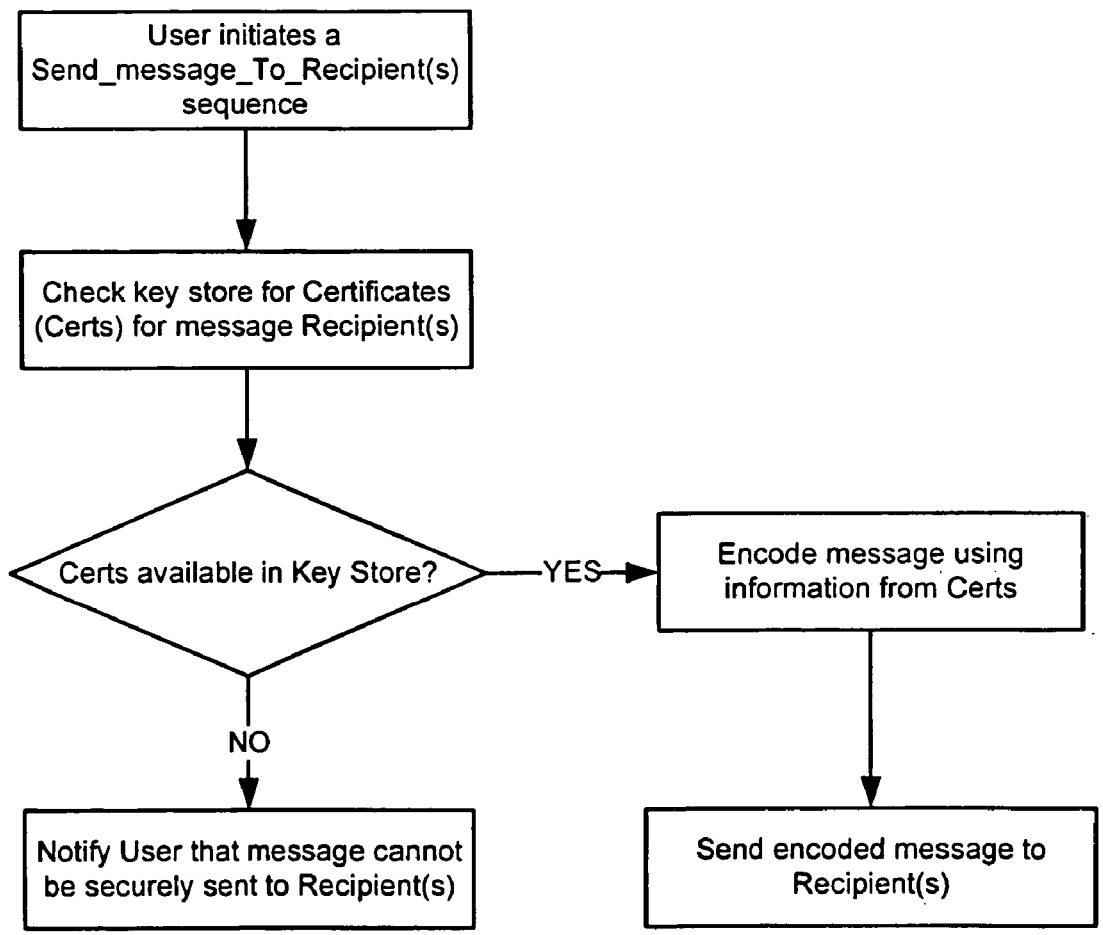
FIG. 3 is a flowchart of a method for handling an attempt to send a secure message.

FIG. 3 illustrates a typical scenario in which the user attempts to send a secure message to one or more recipients. After composing the message and addressing it to one or more recipients, the user attempts to send the message by selecting a Send option provided by a messaging application used by the user. The user may indicate that the message is to be sent securely, for instance, by configuring the messaging application to always send messages securely. If the message is to be sent securely, the messaging application checks a Key Store for certificates (Certs) associated with each of the recipients. If a Cert is not available, the messaging application notifies the user that a required Cert was unavailable and that the message cannot be sent securely to the recipients. The user would then have to send the message unsecured or attempt to retrieve the required Certs prior to sending the message. If the Certs are available in the Key Store, the message may be encoded in accordance with the users preferences and then transmitted to the recipients. However, if one or more of the Certs are invalid, the recipients may not be able to decrypt the message and consequently authenticate the sender's identity contained in the encrypted message, since the message was encoded using an invalid Cert.

Figure 4:
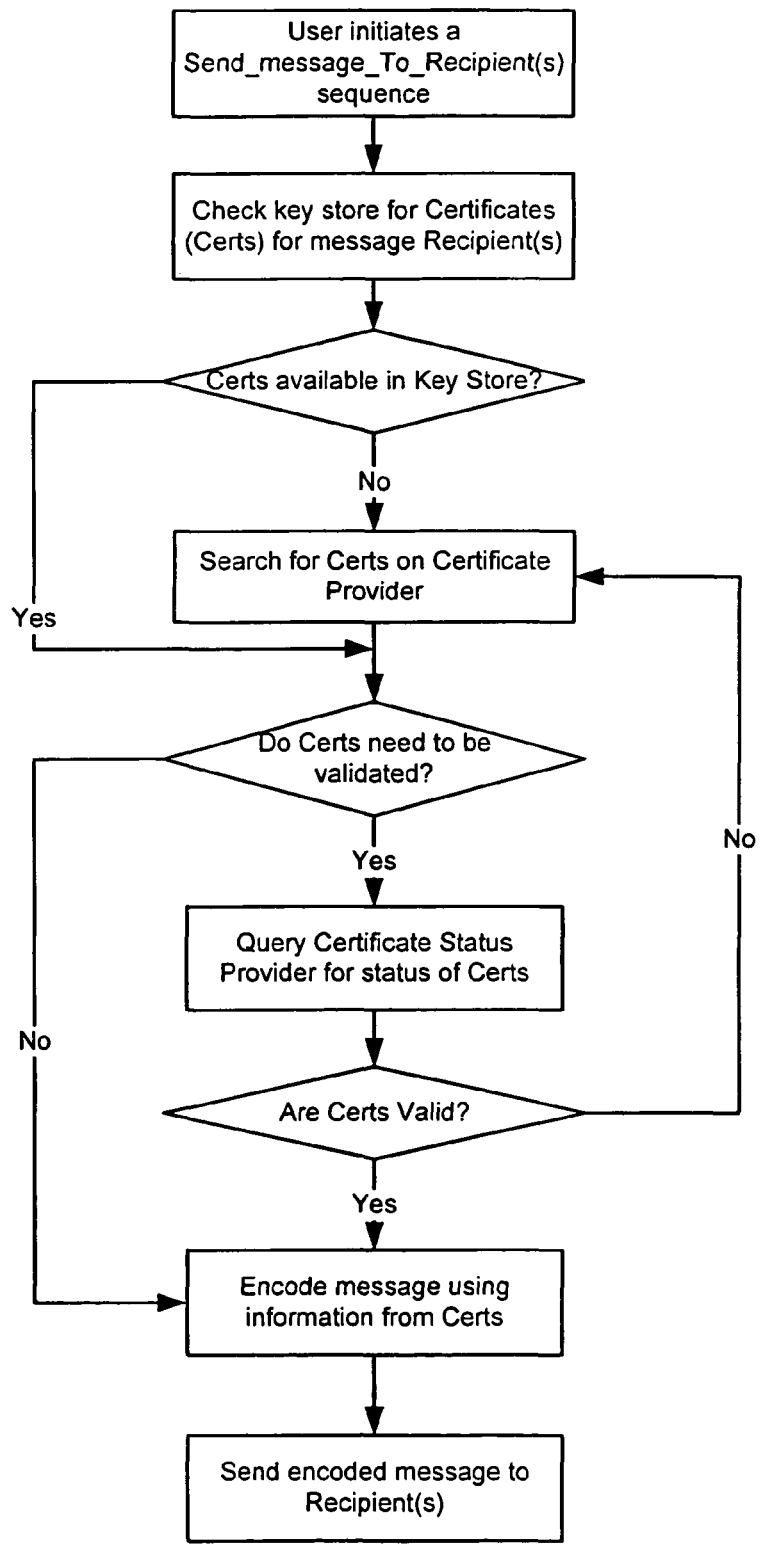
FIG. 4 is a flowchart of a method for sending a secure message.

FIG. 4 illustrates a preferred embodiment of a system and method for sending secure messages. The user composes a message to send to one or more recipients using a messaging application. The user then selects a Send option provided by the messaging application in order to initiate a message sending sequence. Various messaging applications provide the Send option in various ways, such as through an option available on a command menu provided by the messaging application.

If the user indicates that the message is to sent securely, the messaging application then proceeds to retrieve Certs associated with each of the recipients. There are many ways in which the user may indicate that the message is to be sent securely. The user may specify during message composition that the message is to be securely sent. Alternatively, the user may indicate that messages sent from the messaging application should always be sent securely, or may indicate that message addressed to certain recipients should always be securely sent. As another alternative, an IT department associated with the user may enforce a security policy on the messaging application whereby messages are to always be sent securely. Such security policies are typically downloaded periodically to devices such as mobile device 10 on which the messaging application may reside.

The required Certs may be found in a Key Store to which the messaging application has access. If the Cert is not present in the Key Store, the messaging application proceeds to retrieve the required Certs prior to encoding the message. In order to retrieve the Certs, the messaging application may query one or more Cert services that provide Certs to applications that request them. As an example, there may be a designated certificate server provided on a network to which the messaging application has access. The certificate server may be operated by the IT department associated with the user, or may be operated by a third-party that provides such Cert services. The list of Cert services that the messaging application can access may be configured by the user, or alternatively, though the security policy provided by the IT department associated with the user. The list of Cert services may be ranked in order of preference, as some Cert services are more trustworthy than others. If the required Cert is available on one of the Cert services, the Cert is retrieved by the messaging application, or alternatively, by an application that retrieves Certs on behalf of the messaging application. If a plurality of matching Certs are retrieved, then the message may be encoded using each one of them.

Once the required Certs are retrieved from the Cert Services, or if they were already present in the Key Store, they may need to be checked for validity. The validity of a Cert may change over time for a number of reasons, such as if the private key associated with the Cert was compromised in some way, or if the Cert has simply expired. If the message application determines that the Certs have not been validated for a period of time, the Certs will have to be validated. For example, the security policy may require that a Cert status be checked periodically, with the periodicity set by the security policy. If the Cert hasn't been validated within the specified period, the Cert is considered "stale", and the validity has to be determined prior to usage of the Cert. Typically, the validity of a Cert may be checked through a CRL or through a Cert Status Provider that the messaging application can access. In some cases, the Cert Status Provider may be the same as the Cert service used to retrieve a Cert. If the required Certs are not valid, then a valid Cert should be retrieved prior to performing any encoding using information present in the Cert. In this case, the messaging application attempts to retrieve the Certs as described above. If a Cert cannot be retrieved, then the user is presented with an option to attempt to retrieve the Certs.

Once the required Certs have been retrieved and validated, the messaging application then proceeds to encode the message using information in the Certs, such as the recipient's public key. As will be understood, the messaging application may invoke an application that is configured to perform the steps in the process described above. If no Cert can be located, or if all attempts to validate any retrieved Certs fail, then the user may be required to manually intervene to locate a valid Cert using other means.

The systems and methods disclosed herein are presented only by way of example and are not meant to limit the scope of the invention. Other variations of the systems and methods described above will be apparent to those skilled in the art and as such are considered to be within the scope of the invention. For example, it should be understood that steps and the order of the steps in the processing described herein may be altered, modified and/or augmented and still achieve the desired outcome.

Figure 5:
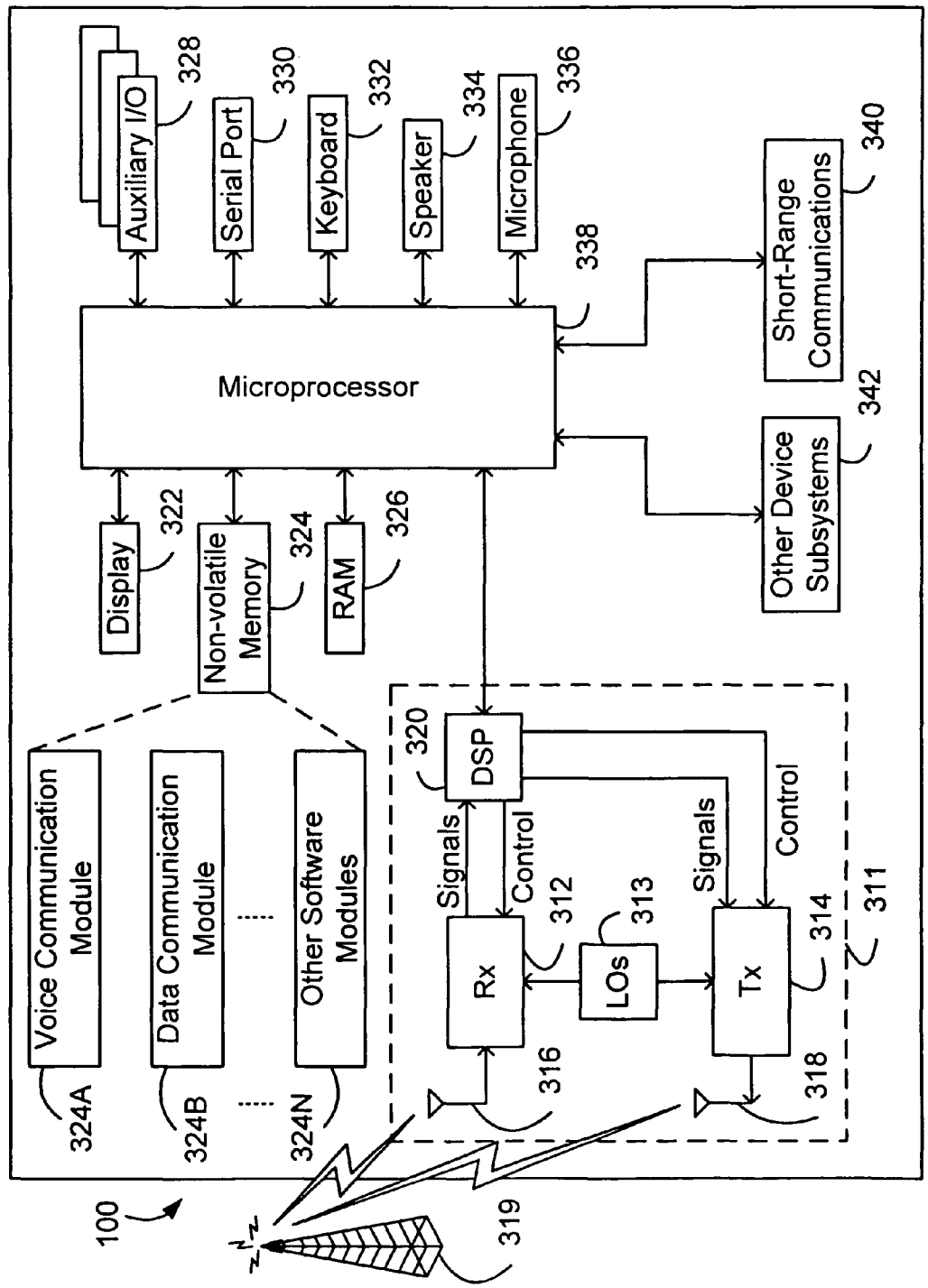
FIG. 5 is a block diagram of a system overview of a wireless device.

As another example, the systems and methods disclosed herein may be used with many different computers and devices, such as a wireless mobile communications device shown in FIG. 5. With reference to FIG. 5, the mobile device 100 is a dual-mode mobile device and includes a transceiver 311, a microprocessor 338, a display 322, non-volatile memory 324, random access memory (RAM) 326, one or more auxiliary input/output (I/O) devices 328, a serial port 330, a keyboard 332, a speaker 334, a microphone 336, a short-range wireless communications sub-system 340, and other device sub-systems 342.

The transceiver 311 includes a receiver 312, a transmitter 314, antennas 316 and 318, one or more local oscillators 313, and a digital signal processor (DSP) 320. The antennas 316 and 318 may be antenna elements of a multiple-element antenna, and are preferably embedded antennas. However, the systems and methods described herein are in no way restricted to a particular type of antenna, or even to wireless communication devices.

The mobile device 100 is preferably a two-way communication device having voice and data communication capabilities. Thus, for example, the mobile device 100 may communicate over a voice network, such as any of the analog or digital cellular networks, and may also communicate over a data network. The voice and data networks are depicted in FIG. 5 by the communication tower 319. These voice and data networks may be separate communication networks using separate infrastructure, such as base stations, network controllers, etc., or they may be integrated into a single wireless network.

The transceiver 311 is used to communicate with the network 319, and includes the receiver 312, the transmitter 314, the one or more local oscillators 313 and the DSP 320. The DSP 320 is used to send and receive signals to and from the transceivers 316 and 318, and also provides control information to the receiver 312 and the transmitter 314. If the voice and data communications occur at a single frequency, or closely-spaced sets of frequencies, then a single local oscillator 313 may be used in conjunction with the receiver 312 and the transmitter 314. Alternatively, if different frequencies are utilized for voice communications versus data communications for example, then a plurality of local oscillators 313 can be used to generate a plurality of frequencies corresponding to the voice and data networks 319. Information, which includes both voice and data information, is communicated to and from the transceiver 311 via a link between the DSP 320 and the microprocessor 338.

The detailed design of the transceiver 311, such as frequency band, component selection, power level, etc., will be dependent upon the communication network 319 in which the mobile device 100 is intended to operate. For example, a mobile device 100 intended to operate in a North American market may include a transceiver 311 designed to operate with any of a variety of voice communication networks, such as the Mobitex or DataTAC mobile data communication networks, AMPS, TDMA, CDMA, PCS, etc., whereas a mobile device 100 intended for use in Europe may be configured to operate with the GPRS data communication network and the GSM voice communication network. Other types of data and voice networks, both separate and integrated, may also be utilized with a mobile device 100.

Depending upon the type of network or networks 319, the access requirements for the mobile device 100 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module ("SIM"), which is required in order to operate a mobile device on a GPRS network. Local or non-network communication functions (if any) may be operable, without the SIM device, but a mobile device will be unable to carry out any functions involving communications over the data network 319, other than any legally required operations, such as '911' emergency calling.

After any required network registration or activation procedures have been completed, the mobile device 100 may the send and receive communication signals, including both voice and data signals, over the networks 319. Signals received by the antenna 316 from the communication network 319 are routed to the receiver 312, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 320. In a similar manner, signals to be transmitted to the network 319 are processed, including modulation and encoding, for example, by the DSP 320 and are then provided to the transmitter 314 for digital to analog conversion, frequency up conversion, filtering, amplification and transmission to the communication network 319 via the antenna 318.

In addition to processing the communication signals, the DSP 320 also provides for transceiver control. For example, the gain levels applied to communication signals in the receiver 312 and the transmitter 314 may be adaptively controlled through automatic gain control algorithms implemented in the DSP 320. Other transceiver control algorithms could also be implemented in the DSP 320 in order to provide more sophisticated control of the transceiver 311.

The microprocessor 338 preferably manages and controls the overall operation of the mobile device 100. Many types of microprocessors or microcontrollers could be used here, or, alternatively, a single DSP 320 could be used to carry out the functions of the microprocessor 338. Low-level communication functions, including at least data and voice communications, are performed through the DSP 320 in the transceiver 311. Other, high-level communication applications, such as a voice communication application 324A, and a data communication application 324B may be stored in the non-volatile memory 324 for execution by the microprocessor 338. For example, the voice communication module 324A may provide a high-level user interface operable to transmit and receive voice calls between the mobile device 100 and a plurality of other voice or dual-mode devices via the network 319. Similarly, the data communication module 324B may provide a high-level user interface operable for sending and receiving data, such as e-mail messages, files, organizer information, short text messages, etc., between the mobile device 100 and a plurality of other data devices via the networks 319. The microprocessor 338 also interacts with other device subsystems, such as the display 322, the RAM 326, the auxiliary input/output (I/O) subsystems 328, the serial port 330, the keyboard 332, the speaker 334, the microphone 336, the short-range communications subsystem 340 and any other device subsystems generally designated as 342.

Some of the subsystems shown in FIG. 5 perform communication-related functions, whereas other subsystems may provide "resident" or on-device functions. Notably, some subsystems, such as the keyboard 332 and the display 322 may be used for both communication-related functions, such as entering a text message for transmission over a data communication network, and device-resident functions such as a calculator or task list or other PDA type functions.

Operating system software used by the microprocessor 338 is preferably stored in a persistent store such as non-volatile memory 324. The non-volatile memory 324 may be implemented, for example, as a Flash memory component, or as battery backed-up RAM. In addition to the operating system, which controls low-level functions of the mobile device 310, the non-volatile memory 324 includes a plurality of software modules 324A-324N that can be executed by the microprocessor 338 (and/or the DSP 320), including a voice communication module 324A, a data communication module 324B, and a plurality of other operational modules 324N for carrying out a plurality of other functions. These modules are executed by the microprocessor 338 and provide a high-level interface between a user and the mobile device 100. This interface typically includes a graphical component provided through the display 322, and an input/output component provided through the auxiliary I/O 328, keyboard 332, speaker 334, and microphone 336. The operating system, specific device applications or modules, or parts thereof, may be temporarily loaded into a volatile store, such as RAM 326 for faster operation. Moreover, received communication signals may also be temporarily stored to RAM 326, before permanently writing them to a file system located in a persistent store such as the Flash memory 324.

An exemplary application module 324N that may be loaded onto the mobile device 100 is a personal information manager (PIM) application providing PDA functionality, such as calendar events, appointments, and task items. This module 324N may also interact with the voice communication module 324A for managing phone calls, voice mails, etc., and may also interact with the data communication module for managing e-mail communications and other data transmissions. Alternatively, all of the functionality of the voice communication module 324A and the data communication module 324B may be integrated into the PIM module.

The non-volatile memory 324 preferably also provides a file system to facilitate storage of PIM data items on the device. The PIM application preferably includes the ability to send and receive data items, either by itself, or in conjunction with the voice and data communication modules 324A, 324B, via the wireless networks 319. The PIM data items are preferably seamlessly integrated, synchronized and updated, via the wireless networks 319, with a corresponding set of data items stored or associated with a host computer system, thereby creating a mirrored system for data items associated with a particular user.

Context objects representing at least partially decoded data items, as well as fully decoded data items, are preferably stored on the mobile device 100 in a volatile and non-persistent store such as the RAM 326. Such information may instead be stored in the non-volatile memory 324, for example, when storage intervals are relatively short, such that the information is removed from memory soon after it is stored. However, storage of this information in the RAM 326 or another volatile and non-persistent store is preferred, in order to ensure that the information is erased from memory when the mobile device 100 loses power. This prevents an unauthorized party from obtaining any stored decoded or partially decoded information by removing a memory chip from the mobile device 100, for example.

The mobile device 100 may be manually synchronized with a host system by placing the device 100 in an interface cradle, which couples the serial port 330 of the mobile device 100 to the serial port of a computer system or device. The serial port 330 may also be used to enable a user to set preferences through an external device or software application, or to download other application modules 324N for installation. This wired download path may be used to load an encryption key onto the device, which is a more secure method than exchanging encryption information via the wireless network 319. Interfaces for other wired download paths may be provided in the mobile device 100, in addition to or instead of the serial port 330. For example, a USB port would provide an interface to a similarly equipped personal computer.

Additional application modules 324N may be loaded onto the mobile device 100 through the networks 319, through an auxiliary I/O subsystem 328, through the serial port 330, through the short-range communications subsystem 340, or through any other suitable subsystem 342, and installed by a user in the non-volatile memory 324 or RAM 326. Such flexibility in application installation increases the functionality of the mobile device 100 and may provide enhanced on-device functions, communication-related functions, or both. For example, secure communication applications may enable electronic commerce functions and other such financial transactions to be performed using the mobile device 100.

When the mobile device 100 is operating in a data communication mode, a received signal, such as a text message or a web page download, is processed by the transceiver module 311 and provided to the microprocessor 338, which preferably further processes the received signal in multiple stages as described above, for eventual output to the display 322, or, alternatively, to an auxiliary I/O device 328. A user of mobile device 100 may also compose data items, such as e-mail messages, using the keyboard 332, which is preferably a complete alphanumeric keyboard laid out in the QWERTY style, although other styles of complete alphanumeric keyboards such as the known DVORAK style may also be used. User input to the mobile device 100 is further enhanced with a plurality of auxiliary I/O devices 328, which may include a thumbwheel input device, a touchpad, a variety of switches, a rocker input switch, etc. The composed data items input by the user may then be transmitted over the communication networks 319 via the transceiver module 311.

When the mobile device 100 is operating in a voice communication mode, the overall operation of the mobile device is substantially similar to the data mode, except that received signals are preferably be output to the speaker 334 and voice signals for transmission are generated by a microphone 336. Alternative voice or audio I/O subsystems, such as a voice message recording subsystem, may also be implemented on the mobile device 100. Although voice or audio signal output is preferably accomplished primarily through the speaker 334, the display 322 may also be used to provide an indication of the identity of a calling party, the duration of a voice call, or other voice call related information. For example, the microprocessor 338, in conjunction with the voice communication module and the operating system software, may detect the caller identification information of an incoming voice call and display it on the display 322.

A short-range communications subsystem 340 is also included in the mobile device 100. The subsystem 340 may include an infrared device and associated circuits and components, or a short-range RF communication module such as a Bluetooth™ module or an 802.11 module, for example, to provide for communication with similarly-enabled systems and devices. Those skilled in the art will appreciate that "Bluetooth" and "802.11" refer to sets of specifications, available from the Institute of Electrical and Electronics Engineers, relating to wireless personal area networks and wireless local area networks, respectively.

The systems' and methods' data may be stored in one or more data stores. The data stores can be of many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

We claim:

1. A method for sending a secure e-mail message to recipient using a sender system comprising a communication device, the communication device comprising a key store and being operative to execute a messaging application for composing and encoding an e-mail message, the method comprising:

upon initiation of a message sending sequence of the messaging application to send a composed and addressed e-mail message securely to a recipient from the communication device, said message sending sequence being initiated by selection of a send option of the messaging application, and prior to sending said e-mail message, upon determining at the communication device that no valid security certificate associated with the recipient is stored in the key store, obtaining, by the communication device from a certificate service, a first security certificate associated with the recipient;

determining at the communication device whether said first security certificate thus obtained is valid using a validity status of said first security certificate obtained from a certificate status provider;

when said first security certificate thus obtained is determined not to be valid, the communication device repeating said obtaining to obtain a further security certificate associated with the recipient and repeating said determining to determine a validity status of said further security certificate until one of the further security certificates obtained by said repetition is determined to be valid; and storing said valid further security certificate in the key store; and encoding, by the communication device, the e-mail message using information contained in said valid further security certificate to provide a secure e-mail message; and sending the secure e-mail message from the communication device to the recipient.

2. The method of claim 1, wherein determining whether said first security certificate thus obtained is valid comprises determining whether the status of said first security certificate has not been checked within a period defined by a periodicity value set by a security policy implemented at the communication device.

3. The method of claim 1, wherein the certificate service is the certificate status provider.

4. The method of claim 1, wherein obtaining said first security certificate from the certificate service comprises accessing a list of certificate services and selecting at least one certificate services to access from the list.

5. The method of claim 4, wherein the list of certificate services is ranked in order of trustworthiness and the selection of the at least one certificate service from the list is determined by the said ranking.

6. The method of claim 1, wherein the method is executed by a data communication module at the communication device.

7. The method of claim 1, wherein determining that no valid security certificate associated with the recipient is stored in the key store comprises determining that no security certificate associated with the recipient stored in key store is both valid according to said security certificate's status and validated according to a security policy implemented at the communication device.

8. The method of claim 7, wherein determining that no security certificate associated with the recipient stored in the key store is both valid according to said security certificate's status and validated according to the security policy implemented at the communication device comprises determining that any security certificate associated with the recipient stored in the key store has not been validated for a predetermined period of time defined in the security policy.

9. The method of claim 1 wherein the valid further security certificate thus obtained comprises a public key and wherein encoding the e-mail message comprises encrypting the e-mail message using the public key.

10. The method of claim 1, further comprising the initial step of accepting a request to send the e-mail message to the recipient.

11. The method of claim 1, further comprising determining that the e-mail message is to be sent securely by accessing security policy information on the communication device for e-mail messages composed on the device.

12. A communication device configured to generate a secure e-mail message addressed to a recipient, the communication device comprising:
- a key store configured to store at least one security certificate;
- a transceiver configured to communicate over a network with at least one certificate service;
- a processor configured to:
    - upon initiation of a message sending sequence of a messaging application executing at the communication device to send a composed and addressed e-mail message securely to the recipient from the communication device, said message sending sequence being initiated by selection of a send option of the messaging application, and prior to sending said e-mail message,
        - upon determining that no valid security certificate associated with the recipient is stored in the key store,
            - obtain a security certificate associated with the recipient from the at least one certificate service via the transceiver;
            - determine whether said first security certificate thus obtained is valid using a validity status of said first security certificate obtained from a certificate status provider; and
            - when said first security certificate thus obtained is determined not to be valid, repeat said obtaining to obtain a further security certificate associated with the recipient and repeat said determining to determine a validity status of said different security certificate until one of the further security certificates obtained by said repetition is determined to be valid; and
            - store said security certificate in the key store; and
        - encode the e-mail message using information contained in the valid further security certificate thus obtained, to provide a secure e-mail message; and
    - send the secure e-mail message to the recipient via the transceiver.

13. The communication device of claim 12, wherein determining whether said first security certificate thus obtained is valid comprises determining whether the status of said first security certificate has not been checked within a period defined by a periodicity value set by a security policy implemented at the communication device.

14. The communication device of claim 12, wherein the at least one certificate service is selected from a list of certificate services ranked in order of trustworthiness, the selection of said at least one certificate service being determined by said ranking.

15. The communication device of claim 12 wherein the processor is configured to determine that no valid security certificate associated with the recipient is stored in the key store by determining that no security certificate associated with the recipient stored in key store is both valid according to said security certificate's status and validated according to a security policy implemented at the communication device.

16. The communication device of claim 12 wherein the valid further security certificate comprises a public key and wherein the processor is further configured to cause the system to encrypt the e-mail message using the public key.

17. The communication device of claim 12 wherein the communication device comprises a wireless handheld device.

18. The communication device of claim 15 wherein determining that no security certificate associated with the recipient stored in the key store is both valid according to said security certificate's status and validated according to the security policy implemented at the communication device comprises determining that any security certificate associated with the recipient stored in the key store has not been validated for a predetermined period of time defined in the security policy.

19. The communication device of claim 12, wherein the processor is further configured to determine that the e-mail message is to be sent securely by accessing security policy information on the communication device for e-mail messages composed on the device.

20. A non-transitory computing device-readable medium storing messaging application program code which, when executed by a communication device, causes the communication device to:
- upon initiation of a message sending sequence of the messaging application to send a composed and addressed e-mail message securely to a recipient from the communication device, said message sending sequence being initiated by selection of a send option of the messaging application, and prior to sending said e-mail message,
    - upon determining at the communication device that no valid security certificate associated with the recipient is stored in the key store;
        - obtaining, by the communication device from a certificate service, a first security certificate associated with the recipient;
        - determining at the communication device whether said first security certificate thus obtained is valid using a validity status of said first security certificate obtained from a certificate status provider;
        - when said first security certificate thus obtained is determined not to be valid, the communication device repeating said obtaining to obtain a further security certificate associated with the recipient and repeating said determining to determine a validity status of said further security certificate until one of the further security certificates obtained by said repetition is determined to be valid; and
        - storing said valid further security certificate in the key store; and
    - encoding, by the communication device, the e-mail message using information contained in the valid further security certificate thus obtained, to provide a secure e-mail message; and
- sending the secure e-mail message from the communication device to the recipient.

21. The non-transitory computing device-readable medium of claim 20, wherein determining whether said first security certificate thus obtained is valid comprises determining whether the status of said first security certificate has not been checked within a period defined by a periodicity value set by a security policy implemented at the communication device.

22. The non-transitory computing device-readable medium of claim 20, wherein obtaining said first security certificate associated with the recipient from the certificate service comprises accessing a list of certificate services and selecting at least one certificate service to access from the list.

23. The non-transitory computing device-readable medium of claim 20, wherein determining that no valid security certificate associated with the recipient is stored in the key store comprises determining that no security certificate associated with the recipient stored in key store is both valid according to said security certificate's status and validated according to a security policy implemented at the communication device.

24. The non-transitory computing device-readable medium of claim 20, wherein the valid further security certificate comprises a public key and wherein encoding the e-mail message comprises encrypting the e-mail message using the public key.

25. The non-transitory computing device-readable medium of claim 22, wherein the list of certificate services is ranked in order of trustworthiness, and the selection of the at least one certificate service from the list is determined by the said ranking.

26. The non-transitory computing device-readable medium of claim 23, wherein determining that no security certificate associated with the recipient stored in the key store is both valid according to said security certificate's status and validated according to the security policy implemented at the communication device comprises determining that any security certificate associated with the recipient stored in the key store has not been validated for a predetermined period of time defined in the security policy.

27. A wireless handheld device comprising a memory for storing a key store and a memory for storing messaging application program code configured to cause the wireless handheld device to send an e-mail message to a recipient, the device comprising messaging application program code configured, when executed by the wireless handheld device, to cause the device to implement the method of:
upon initiation of a message sending sequence to send a composed and addressed e-mail message securely to a recipient from the communication device, said message sending sequence being initiated by selection of a send option of the messaging application, and prior to sending said e-mail message,
upon determining at the communication device that no valid security certificate associated with the recipient is stored in the key store;
obtaining, by the communication device from a certificate service, a first security certificate associated with the recipient;
determining at the communication device whether said first security certificate thus obtained is valid using a validity status of said first security certificate obtained from a certificate status provider;
when said first security certificate thus obtained is determined not to be valid, repeating said obtaining to obtain a further security certificate associated with the recipient and repeating said determining to determine a validity status of said further security certificate until one of the further security certificates obtained by said repetition is determined to be valid; and
storing said valid further security certificate in the key store; and
encoding, by the communication device, the e-mail message using information contained in the valid further security certificate thus obtained, to provide a secure e-mail message; and
sending the secure e-mail message from the communication device to the recipient.

28. The wireless handheld device of claim 27, wherein determining that no valid security certificate associated with the recipient is stored in the key store comprises determining that no security certificate associated with the recipient stored in key store is both valid according to said security certificate's status and validated according to a security policy implemented at the communication device.

29. The wireless handheld device of claim 28, wherein determining that no security certificate associated with the recipient stored in the key store is both valid according to said security certificate's status and validated according to the security policy implemented at the wireless handheld device comprises determining that any security certificate associated with the recipient stored in the key store has not been validated for a predetermined period of time defined in the security policy.

30. The method of claim 1, wherein encoding the e-mail message comprises encrypting the e-mail message, and the secure e-mail message comprises the encrypted e-mail message.

* * * * *